(12) United States Patent
Usuda

(10) Patent No.: US 10,471,537 B2
(45) Date of Patent: Nov. 12, 2019

(54) DIRECT DIODE LASER PROCESSING APPARATUS AND SHEET METAL PROCESSING METHOD USING THE SAME

(71) Applicant: AMADA HOLDINGS CO., LTD., Kanagawa (JP)

(72) Inventor: Kaori Usuda, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 294 days.

(21) Appl. No.: 15/517,705

(22) PCT Filed: Sep. 8, 2015

(86) PCT No.: PCT/JP2015/075433
§ 371 (c)(1),
(2) Date: Apr. 7, 2017

(87) PCT Pub. No.: WO2016/059915
PCT Pub. Date: Apr. 21, 2016

(65) Prior Publication Data
US 2017/0304941 A1 Oct. 26, 2017

(30) Foreign Application Priority Data
Oct. 14, 2014 (JP) .................. 2014-209908

(51) Int. Cl.
*B23K 26/02* (2014.01)
*B23K 26/06* (2014.01)
(Continued)

(52) U.S. Cl.
CPC .......... *B23K 26/0617* (2013.01); *B23K 26/14* (2013.01); *B23K 26/38* (2013.01)

(58) Field of Classification Search
None
See application file for complete search history.

(56) References Cited

U.S. PATENT DOCUMENTS 4,869,999 A * 9/1989 Fukuda .................. G03F 7/2022
430/311
5,579,044 A * 11/1996 Warner .................... B41J 19/20
347/236
(Continued)

FOREIGN PATENT DOCUMENTS

JP   2000-61667    2/2000
JP   2006-525874   11/2006
(Continued)

OTHER PUBLICATIONS

English translation of JP 2010-158686 to Nomaru, published Jul. 22, 2010 (Year: 2010).*
(Continued)

*Primary Examiner* — Michael A Laflame, Jr.
(74) *Attorney, Agent, or Firm* — Greenblum & Bernstein, P.L.C.

(57) ABSTRACT

A direct diode laser processing apparatus includes a laser oscillator that emits a multiple-wavelength laser beam, a transmission fiber that transmits the multiple-wavelength laser beam emitted from the laser oscillator, and a laser processing machine that condenses the multiple-wavelength laser beam transmitted through the transmission fiber and processes a workpiece. According to chromatic aberrations of the multiple-wavelength laser beam and the wavelength dependence of emissivity of the workpiece, a light intensity distribution of the multiple-wavelength laser beam in a thickness direction of the workpiece is provided with a plurality of peaks.

15 Claims, 6 Drawing Sheets

(51) Int. Cl.
  *B23K 26/38* (2014.01)
  *B23K 26/14* (2014.01)

(56) References Cited

U.S. PATENT DOCUMENTS

| | | | | |
|---|---|---|---|---|
| 6,150,629 A * | 11/2000 | Sievers | ............. | B23K 26/0613 |
| | | | | 219/121.62 |
| 6,535,531 B1 * | 3/2003 | Smith | .................. | G03F 7/7055 |
| | | | | 372/25 |
| 7,477,356 B2 * | 1/2009 | Asaishi | ............. | G03F 7/70575 |
| | | | | 355/53 |
| 7,656,503 B2 * | 2/2010 | Miura | .................... | G03B 27/54 |
| | | | | 355/53 |
| 7,858,901 B2 * | 12/2010 | Krishnan | ........... | B23K 26/0617 |
| | | | | 219/121.68 |
| 8,621,996 B2 * | 1/2014 | Aviel | ........................ | B41C 1/05 |
| | | | | 101/401.1 |
| 2005/0083983 A1 * | 4/2005 | Sandstrom | ............. | G01J 1/429 |
| | | | | 372/55 |
| 2006/0044981 A1 * | 3/2006 | Egawa | .................. | B23K 26/06 |
| | | | | 369/53.24 |
| 2006/0261050 A1 | 11/2006 | Krishnan et al. | | |
| 2008/0018943 A1 * | 1/2008 | Eyal | .................. | B23K 26/0608 |
| | | | | 358/3.29 |
| 2009/0218326 A1 * | 9/2009 | Chouf | ................ | B23K 26/0648 |
| | | | | 219/121.72 |
| 2014/0034614 A1 * | 2/2014 | Sbetti | .................. | B23K 26/032 |
| | | | | 219/74 |
| 2014/0246405 A1 * | 9/2014 | Numata | ................. | B23K 26/38 |
| | | | | 219/74 |

FOREIGN PATENT DOCUMENTS

| | | |
|---|---|---|
| JP | 2009-541091 | 11/2009 |
| JP | 2010-158686 | 7/2010 |
| WO | 2010/034603 | 4/2010 |

OTHER PUBLICATIONS

English translation of JP 2000-061667 to (keno, published Feb. 29, 2000 (Year: 2000).*

Search Report and Written Opinion with English language translation issued in International Patent Application No. PCT/JP2015/075433, dated Dec. 15, 2015.

* cited by examiner

DIRECT DIODE LASER PROCESSING APPARATUS AND SHEET METAL PROCESSING METHOD USING THE SAME

TECHNICAL FIELD

The present invention relates to a direct diode laser processing apparatus and a sheet metal processing method using the same.

BACKGROUND ART

Known laser processing apparatuses for processing sheet metal employ, as a laser beam source, a carbon dioxide ($CO_2$) gas laser oscillator, a YAG laser oscillator, or a fiber laser oscillator. The fiber laser oscillator is superior in beam quality to the YAG laser oscillator and has advantages of providing a very high oscillation efficiency and the like. Due to this, the fiber laser processing apparatus using the fiber laser oscillator is used in industrial fields, in particular, in sheet metal processing (cutting, welding, and the like).

Developed in recent years is a direct diode laser (DDL) processing apparatus that uses, as a laser beam source, a direct diode laser oscillator. The DDL processing apparatus employs a plurality of laser diodes (LDs), superimposes laser beams into a multiple-wavelength laser beam, and transmits the laser beam through a transmission fiber to a processing head. The laser beam emitted from an end face of the transmission fiber is concentrated through and irradiated from collimating and condensing lenses onto a workpiece.

In connection with the fiber laser processing apparatus, it is known, as exemplified in Published PCT International Application No. WO2010/034603 (Patent Literature 1), to cut a thick plate by condensing a unique-wavelength laser beam through a multifocal lens to form a plurality of focal points in a thickness direction of the workpiece.

SUMMARY OF INVENTION

Problems to be Solved by Invention

The Patent Literature 1, however, uses no such a multiple-wavelength laser beam as that used by the DDL processing apparatus when processing a workpiece. It simply positions at least one of the plurality of focal points formed in the thickness direction of the workpiece within a thickness range of the workpiece. The patent literature makes no detailed consideration of what kind of light intensity distribution must be formed in the thickness direction of the workpiece.

According to the Patent Literature 1, an absorptance at each beam waist is substantially uniform. This may extend an effective Rayleigh length. The related art, however, has a problem of being unable to deal with absorptance variations occurring depending on wavelengths when processing a workpiece with the multiple-wavelength laser beam by the DDL processing apparatus.

In consideration of the above-mentioned problem, the present invention provides a direct diode laser processing apparatus for processing a workpiece with a multiple-wavelength laser beam, capable of making a light intensity distribution of the laser beam in a thickness direction of the workpiece appropriate for cutting a thick plate. Also provided is a sheet metal processing method for the apparatus.

Means to Solve Problems

According to an aspect of the present invention, the direct diode laser processing apparatus includes a laser oscillator that emits a multiple-wavelength laser beam, a transmission fiber that transmits the multiple-wavelength laser beam emitted from the laser oscillator, and a laser processing machine that condenses the multiple-wavelength laser beam transmitted through the transmission fiber and processes a workpiece. According to chromatic aberrations of the multiple-wavelength laser beam and the wavelength dependence of emissivity of the workpiece, a light intensity distribution of the multiple-wavelength laser beam in a thickness direction of the workpiece is formed to have a plurality of peaks. The sheet metal processing method is for this direct diode laser processing apparatus.

MODE OF IMPLEMENTING INVENTION

With reference to the drawings, an embodiment of the present invention will be explained. In the following description of the drawings, the same or like parts are represented with the same or like reference marks.

Figure 1:
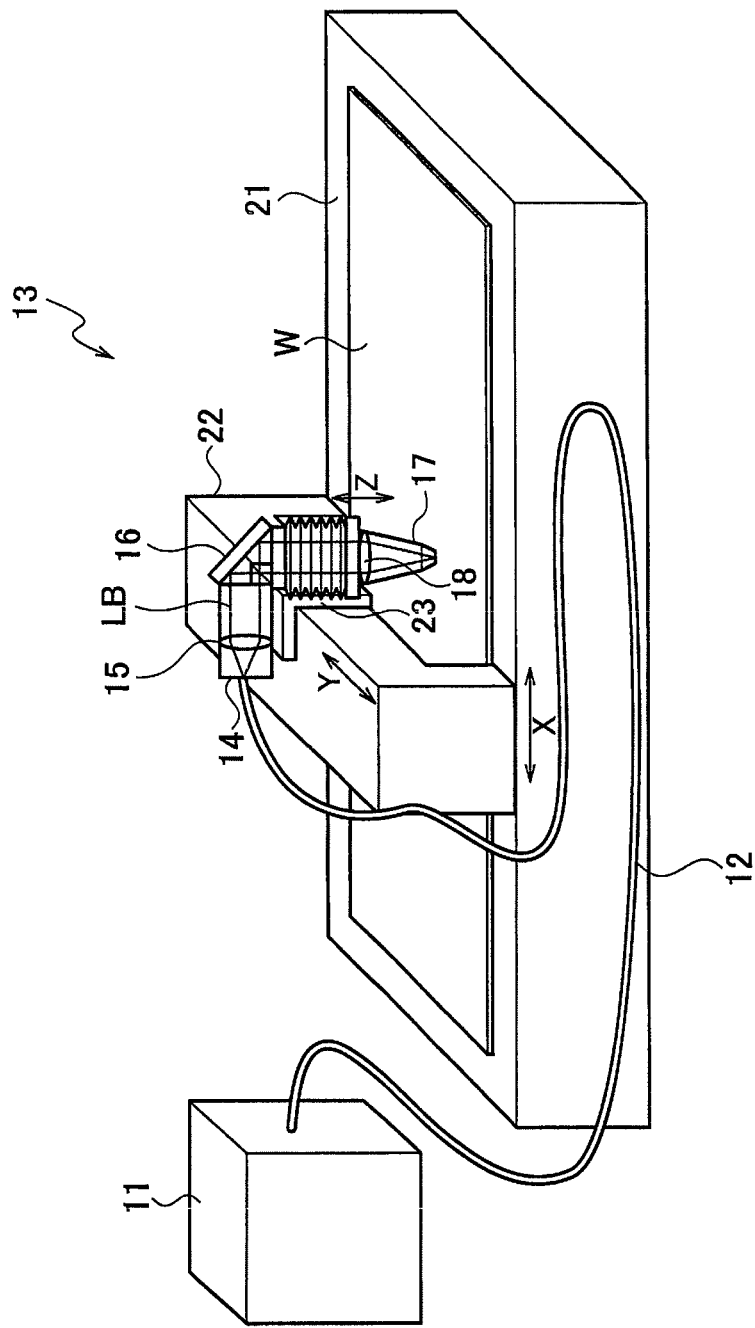
FIG. 1 is a perspective view illustrating an example of a DDL processing apparatus according to an embodiment of the present invention.

With reference to FIG. 1, a general configuration of a direct diode laser (hereinafter referred to as "DDL") processing apparatus according to the embodiment of the present invention will be explained. The DDL processing apparatus according to the embodiment of the present invention includes, as illustrated in FIG. 1, a laser oscillator 11 that emits a multiple-wavelength laser beam LB, a transmission fiber (process fiber) 12 that transmits the laser beam LB emitted from the laser oscillator 11, and a laser processing machine 13 that condenses the laser beam LB transmitted through the transmission fiber 12 into one having a high-energy concentration and emits the same toward a workpiece (work) W.

The laser processing machine 13 includes a collimator unit 14 that converts, through a collimator lens 15, the laser beam LB emitted from the transmission fiber 12 into a substantial parallel beam, a bend mirror 16 that reflects the laser beam LB converted into the substantial parallel beam in a downward Z-axis direction orthogonal to X- and Y-axis directions, and a processing head 17 that condenses, through a condensing lens 18, the laser beam LB reflected by the bend mirror 16. Employable as the collimator lens 15 and condensing lens 18 are standard lenses such as fused silica plano-convex lenses.

Although not illustrated in FIG. 1, the collimator unit 14 incorporates a lens driving unit that drives the collimator lens 15 in a direction (X-axis direction) parallel to an optical axis. To control the lens driving unit, the DDL processing apparatus further includes a control unit.

The laser processing machine 13 also includes a processing table 21 on which the workpiece W is placed, a portal X-axis carriage 22 that moves in the X-axis direction on the processing table 21, and a Y-axis carriage 23 that moves on the X-axis carriage 22 in the Y-axis direction orthogonal to the X-axis direction. The X-axis carriage 22 has a pair of legs and is constituted in a π (pi) shape (bridge shape) striding over the workpiece W. The collimator lens 15 in the collimator unit 14, the bend mirror 16, and the condensing lens 18 in the processing head 17 are preliminarily adjusted to the optical axis, are fixed to the Y-axis carriage 23, and are moved together with the Y-axis carriage 23 in the Y-axis direction. It is possible to arrange a Z-axis carriage movable in an up-down direction with respect to the Y-axis carriage 23 and set the condensing lens 18 on the Z-axis carriage.

The DDL processing apparatus according to the embodiment of the present invention irradiates the workpiece W with the laser beam LB that has been condensed through the condensing lens 18 to have a smallest condensed diameter (minimum condensed diameter). While coaxially jetting an assist gas to remove meltage, the DDL processing apparatus moves the X-axis carriage 22 and Y-axis carriage 23. With this, the DDL processing apparatus cuts and processes the workpiece W. The workpiece W may be made from various materials such as stainless steel, mild steel, and aluminum. The thickness of the workpiece W may be, for example, about 0.1 mm to 100 mm. According to the embodiment of the present invention, the thickness of the workpiece W is preferably 15 mm or greater. It may be 2 mm or greater, or may be 30 mm. A preferable thickness is 100 mm or thinner.

Figure 2A:
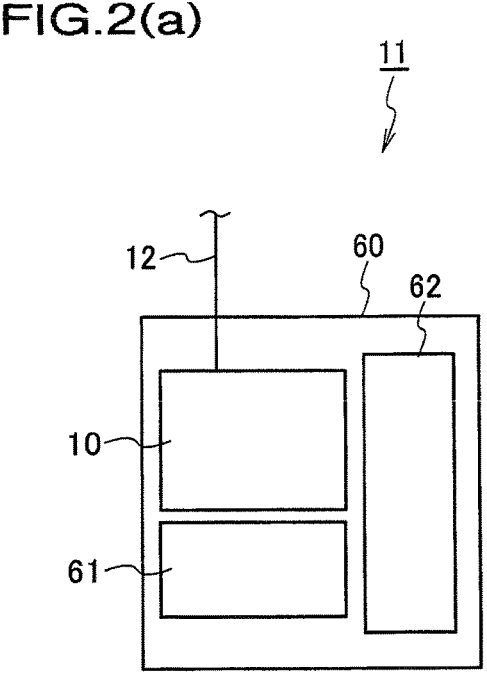
FIG. 2(a) is a front view illustrating an example of a laser oscillator according to the embodiment of the present invention and FIG. 2(b) is a side view illustrating the example of the laser oscillator according to the embodiment of the present invention.
Figure 2B:
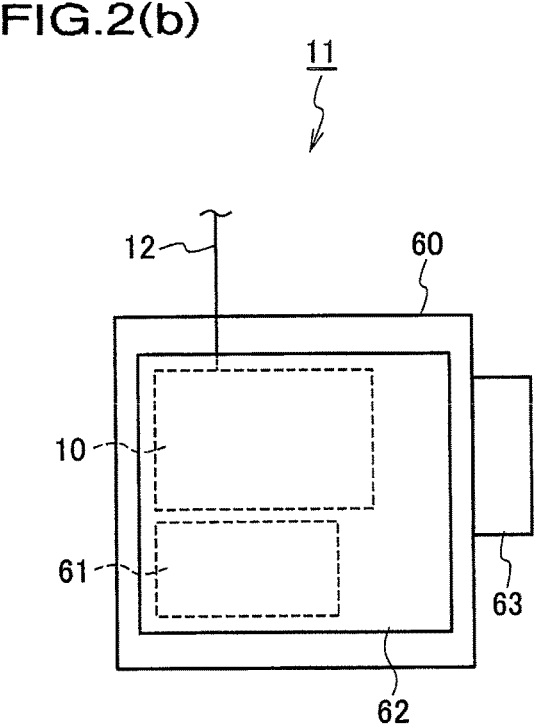
Figure 3:
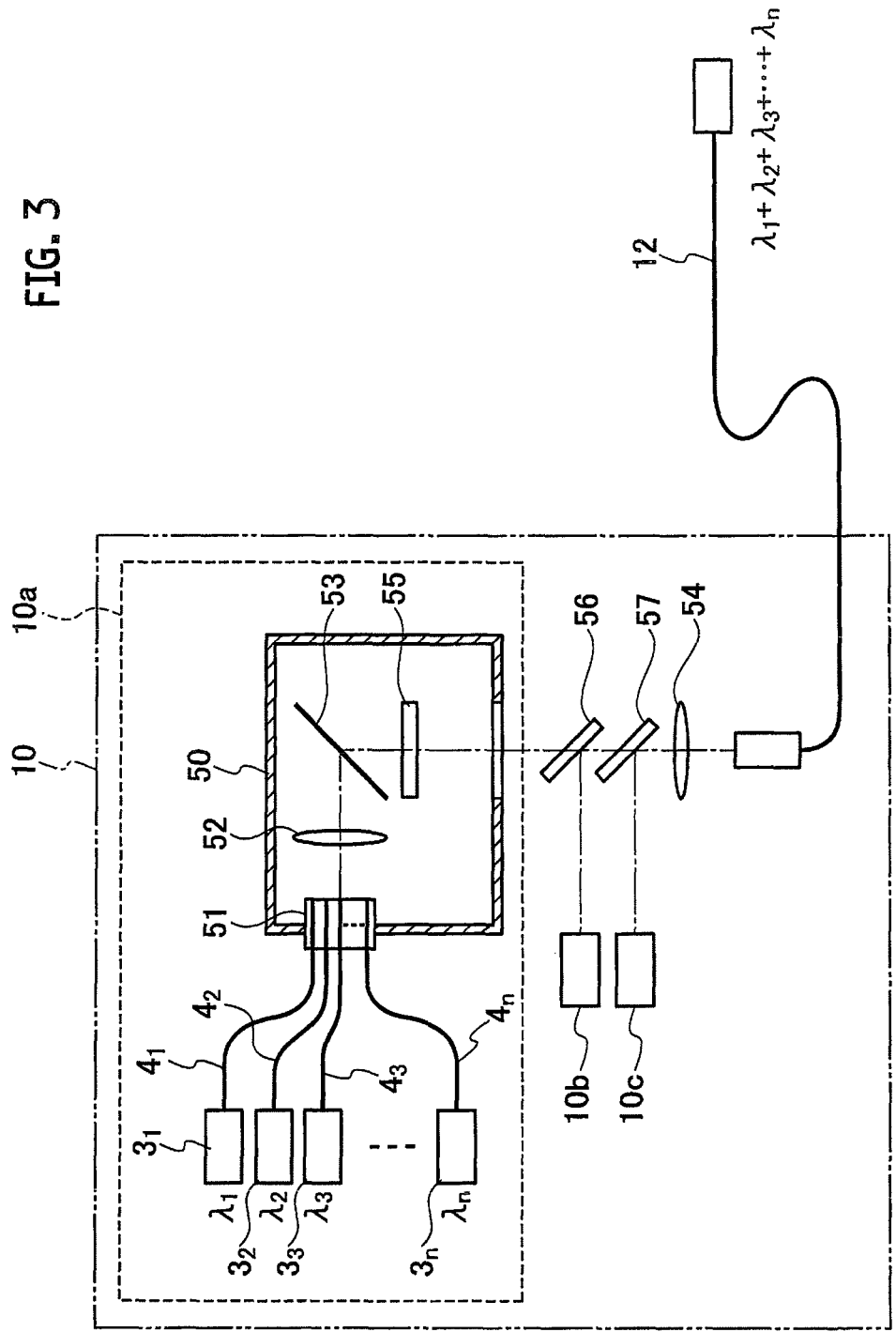
FIG. 3 is a schematic view illustrating an example of a DDL module according to the embodiment of the present invention.

With reference to FIGS. 2 and 3, the laser oscillator 11 will be explained. The laser oscillator 11 includes, as illustrated in FIGS. 2(a) and 2(b), a casing 60, a DDL module 10 accommodated in the casing 60 and connected to the transmission fiber 12, a power source unit 61 accommodated in the casing 60 and supplying power to the DDL module 10, a control module 62 accommodated in the casing 60 and controlling outputs of the DDL module 10 and others, and the like. Arranged outside the casing 60 is an air conditioning device 63 to adjust the temperature and humidity of the inside of the casing 60.

The DDL module 10 includes, as illustrated in FIG. 3, a DDL unit 10a and a condensing lens 54 arranged after the DDL unit 10a. The DDL unit 10a includes a plurality of laser diodes (hereinafter referred to as "LDs") 31, 32, 33, ..., 3n (n being an integer equal to or greater than 4) to output laser beams having multiple wavelengths λ1 (lambda 1), λ2, λ3, ..., λn (hereinafter referred to as "{λi}") and a spectral beam combining unit 50 connected through fibers 41, 42, 43, ..., 4n to the LDs 31, 32, 33, ..., 3n and carrying out spectral beam combining on the laser beams of multiple wavelengths {λi}.

Adoptable as the plurality of LDs 31, 32, 33, ..., 3n (hereinafter referred to as the plurality of LDs 3) are various kinds of semiconductor lasers. Combinations of kind and number for the plurality of LDs 3 are not particularly limited and are properly selected according to a sheet metal processing purpose. The wavelengths λ1, λ2, λ3, ..., λn of the plurality of LDs 3 are selectable from the ranges of, for example, smaller than 1000 nm, 800 nm to 990 nm, and 910 nm to 950 nm.

The laser beams of multiple wavelengths {λi} are managed and controlled block by block based on wavelengths or wavelength bands. Outputs of the laser beams are variably and individually adjusted depending on the wavelengths or wavelength bands thereof. Outputs of all wavelength bands are adjustable in such a way as to maintain a constant absorptance.

A cutting process is achieved by simultaneously driving the LDs 31, 32, 33, ..., 3n and by jetting a proper assist gas such as an oxygen or nitrogen gas to the vicinities of focusing positions. With this, the laser beams with different wavelengths from the LDs 31, 32, 33, ..., 3n cooperate with one another and with the assist gas such as an oxygen gas to melt the workpiece at high speed. Meltage is blown by the assist gas and the workpiece is speedily cut.

The spectral beam combining unit 50 includes a fixing unit 51 that binds and fixes emitting ends of the fibers 41, 42, 43, ..., 4n to form a fiber array 4, a collimator lens 52 that makes the laser beams from the fibers 41, 42, 43, ..., 4n parallel to one another, a diffraction grating 53 that diffracts the laser beams of multiple wavelengths {λi} to make optical axes thereof coincide with one another, and a partial reflection coupler 55 that constitutes a resonator together with a reflection face arranged at rear ends of the plurality of LDs 3. The arranging position of the partial reflection coupler 55 is only an example and is not particularly limited thereto.

The DDL module 10 also includes, as illustrated in FIG. 3, DDL units 10b and 10c with different wavelength bands from that of the DDL unit 10a and dichroic filters 56 and 57 arranged between the DDL unit 10a and the condensing lens 54. Except the differing wavelength bands, the DDL units 10b and 10c are configured similar to the DDL unit 10a. For example, the DDL unit 10a has a wavelength band from 900 nm or greater to smaller than 1000 nm, the DDL unit 10b from 800 nm or greater to smaller than 900 nm, and the DDL unit 10c from 400 nm or greater to smaller than 500 nm. Outputs of the DDL units 10a, 10b, and 10c are variably adjustable unit by unit (i.e., wavelength band by wavelength band).

The dichroic filters 56 and 57 spectral-beam-combine the laser beam that has been spectral-beam-combined by the DDL unit 10a with laser beams that have been spectral-beam-combined by the DDL units 10b and 10c. The condensing lens 54 condenses the laser beam from the dichroic filter 57 and the beam enters the transmission fiber 12. If a relatively narrow wavelength band is employed, the DDL units 10b and 10c and dichroic filters 56 and 57 can be omitted. Although FIG. 3 illustrates three DDL units 10a, 10b, and 10c, it is possible not to employ two of the DDL units and one of the dichroic filters, or possible to employ four or more DDL units and three or more corresponding dichroic filters. The wavelength bands and wavelength ranges of the DDL units 10a, 10b, and 10c are not particularly limited.

When carrying out a cutting process or the like with such a DDL processing apparatus using a multiple-wavelength laser beam, wavelengths of the laser beam have their respective beam waists (beam waist diameters) of, for example, about 100 micrometers to 400 micrometers. These plural diameters form multiple focal points. The beam waists are formed by optical elements including the condensing lens 18 having an incident diameter of about 2 mm to 20 mm and a focal length of 50 mm to 300 mm. Output of the laser oscillator 11 is variably controllable and adjustable wavelength by wavelength or wavelength band by wavelength band so that, at an incident angle of 0 to 40 degrees where an incident angle of 0 degrees is defined normal to a cut face of the workpiece W, an output from a wavelength band on a shorter wavelength side becomes higher than that from a wavelength band on a longer wavelength side. A cutting speed of the workpiece W is selectable in the range of, for example, 60 m/min to 250 m/min.

The DDL processing apparatus according to the embodiment of the present invention carries out processing by condensing a multiple-wavelength laser beam, and therefore, causes chromatic aberrations depending on wavelengths to form a plurality of focal points in a thickness direction of the workpiece W. Emissivity of the workpiece W also changes according to the wavelengths. Here, the emissivity is a ratio of optical energy emitted from an object due to thermal radiation compared to that emitted from a full radiator (black body) and is dependent on wavelength. According to Kirchhoff's law, the emissivity is equal to absorptance. Generally, the shorter the wavelength, the higher the emissivity increases. In other words, a laser beam of shorter wavelength realizes a higher energy absorptance on the workpiece W. The emissivity depends not only on wavelength but also on material of the workpiece W. It also changes depending on surface roughness and surface oxide condition.

The embodiment of the present invention effectively utilizes the chromatic aberrations and the wavelength dependence of emissivity of the workpiece W, to control output of a multiple-wavelength laser beam so that a light intensity distribution in a thickness direction of the workpiece W may have a plurality of peaks. It is preferable that one of the plurality of peaks that is on a shortest wavelength side comes close to the surface of the workpiece W. This results in heightening a light intensity in the vicinity of the surface of the workpiece W and increasing a processing speed of cutting or the like.

It is preferable that two or more of the plurality of peaks are positioned within or around the range of thickness of the workpiece W, i.e. the range from the surface to the bottom surface of the workpiece W. For example, it is preferable that there are two peaks among which one peak on a shorter wavelength side is in the of the surface of the workpiece W and the other peak on a longer wavelength side is in the vicinity of the bottom surface of the workpiece W. This results in maintaining a light intensity up to the vicinity of the bottom surface from the vicinity of the surface of the workpiece W and preventing dross production.

It is preferable that the peak on the shorter wavelength side, i.e. the surface side of the workpiece W, among the plurality of peaks has an intensity greater than that of the peak on the longer wavelength side, i.e. the bottom surface side of the workpiece W. This results in realizing a highest light intensity on the surface side or the workpiece W and maintaining a proper beam intensity for cutting or the like.

The light intensity distribution having a plurality of peak positions and intensities is controlled by the laser oscillator 11 by adjusting outputs of the laser beams with multiple wavelengths. If, for example, the laser oscillator 11 manages laser beams wavelength band by wavelength band (block by block) like the DDL units 10a, 10b, and 10c, at least two laser beams having different wavelengths must be provided from different blocks. For example, at least one laser beam having a wavelength in the wavelength band of 400 nm to 500 nm and at least one laser beam having a wavelength in the wavelength band of 800 nm to 1000 nm are combined and outputted to form two peaks.

One same block may output laser beams having two or more wavelengths that are relatively close to one another to form one peak having an increased intensity. For example, laser beams having three different wavelengths are outputted from a wavelength band of 800 to 1000 nm and are combined to form one peak with a heightened intensity.

Embodiment

An embodiment of cutting process using the DDL processing apparatus according to the embodiment of the present invention will be explained. The present embodiment assumes that the workpiece W is sheet metal having a thickness in the range of 15 mm to 20 mm. In the laser oscillator 11, laser beams of four wavelengths of 400 nm, 808 nm, 915 nm, and 980 nm are generated and beam-spectrum-combined. The beam-spectrum-combined laser beam is transmitted through the transmission fiber 12. The laser beam emitted from the transmission fiber 12 is collimated through the collimator lens 15 such as a standard synthetic fused silica plano-convex lens where f=100 mm and design wavelength=546.1 nm. The collimated beam is condensed through the condensing lens 18 such as a synthetic fused silica plano-convex lens where f=150 mm and design wavelength=546.1 nm. An LD beam parameter product (BPP) is 8 mm·mrad for each wavelength.

Figure 4:
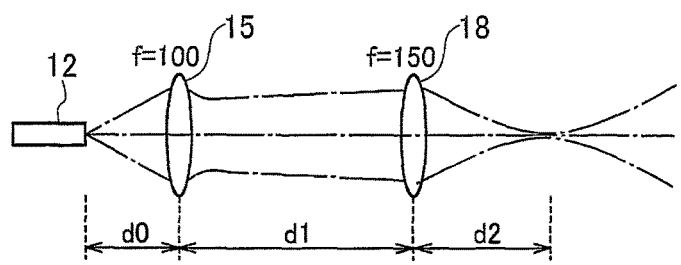
FIG. 4 is a schematic view illustrating an example of a processing optical system according to the embodiment of the present invention.

As illustrated in FIG. 4, a distance d0 between an emission end of the transmission fiber 12 and the collimator lens 15 is 97.8 mm and a distance d1 between the collimator lens 15 and the condensing lens 18 is 244.6 mm. Distances d2 between the condensing lens 18 and beam waists (processing points) are 146.8 mm, 160.5 mm, 161.9 mm, and 162.6 mm for 400 nm, 808 nm, 915 nm, and 980 nm, respectively. Focusing points differ depending on chromatic aberrations, and therefore, a focusing point on the shortest wavelength (400 nm) side is made coincide with the surface of the workplace W.

Figure 5:
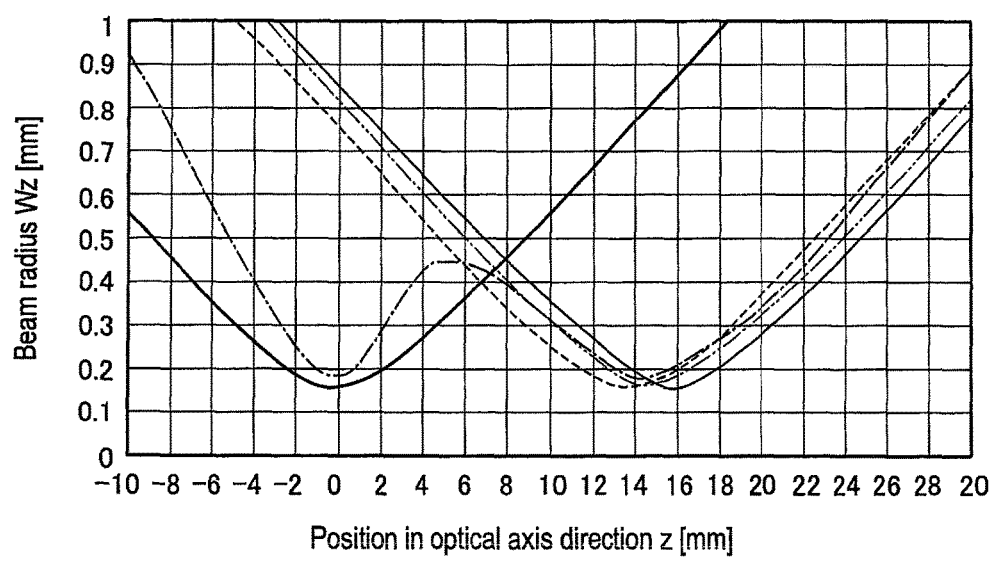
FIG. 5 is a graph illustrating radii of beams with different wavelengths and of a four-wavelength-combined beam with respect to an optical axis in the vicinities of focusing points.
Figure 5:
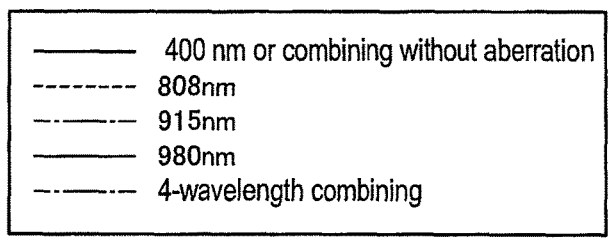

FIG. 5 illustrates radii of beams with different wavelengths and of the four-wavelength-combined beam with respect to an optical axis in the vicinities of focusing points. An optical axis position Z=0 mm, that is a distance from a principal point of the condensing lens 18=146.8 mm (f=150 mm), corresponds to the surface of the workpiece W. A positive direction along the optical axis is a thickness direction of the workpiece W. A combined beam radius of a comparative example that involves no chromatic aberration due to a chromatic aberration correction agrees with the radius of the beam of 400 nm wavelength. The radius of a beam is generally a distance between an optical axis and $1/e^2$ of the peak of a beam's Gaussian intensity distribution. The radius of a combined beam is a distance between an optical axis and $1/e^2$ of the peak of a combined beam's intensity distribution that is formed on an assumption that component beams of different wavelengths each provide an equal output.

As is understood from FIG. 5, the 400-nm beam of the present embodiment concentrates at the surface of the workpiece W. On the other hand, the 808-nm, 815-nm, and 890-nm beams condense at Z=14 mm to 16 mm. Accordingly, in the case of the workpiece W having a thickness of about 15 mm, the 808-nm, 815-nm, and 890-nm beams condense in the vicinities of the bottom surface of the workpiece W, and if the thickness is 15 mm or greater, inside the workpiece W close to the bottom surface thereof.

Figure 6:
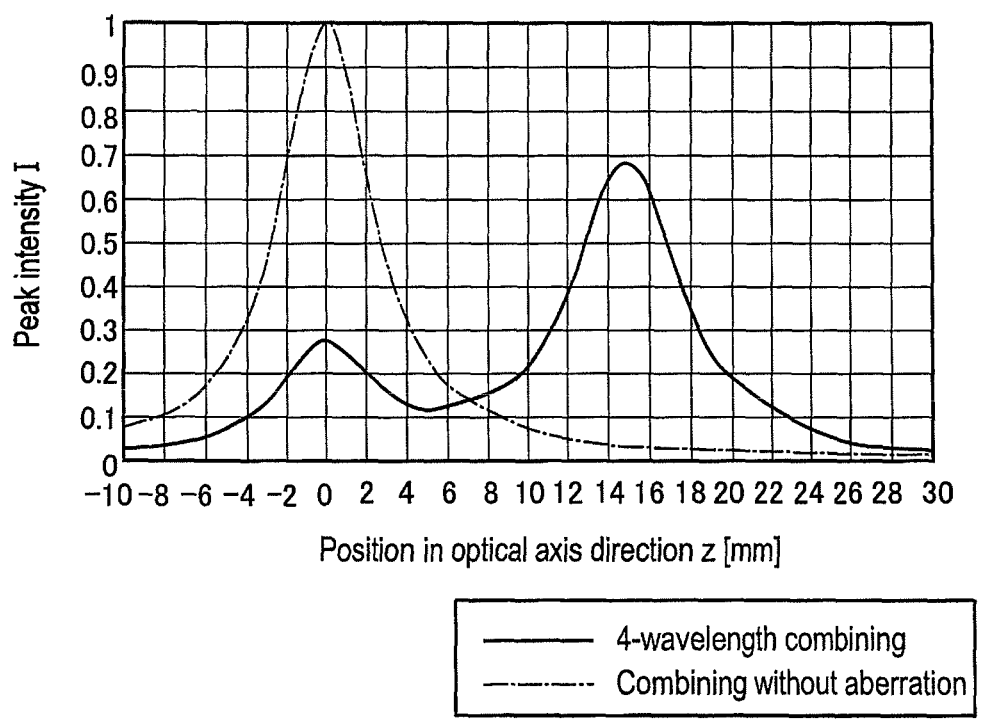
FIG. 6 a graph illustrating peak intensities with respect to the optical axis in the vicinities of the focusing points.

FIG. 6 illustrates relationships of the peak intensities with respect to the optical axis. The peak intensity I is set to be 1 at a focusing point of the combined beam of the comparative example without aberration. As illustrated in FIG. 6, the combined beam without aberration has a high peak at Z=0 mm. The intensity thereof, however, sharply drops in the thickness direction. When the combined beam without aberration of the comparative example cuts a thick workpiece, the surface of the workpiece W may receive a sufficient peak intensity. The intensity, however, may be excessive. The thicker the workpiece W, the lower the peak intensity drops as the beam approaches the bottom surface of the workpiece W, to easily cause dross.

On the other hand, as illustrated in FIG. 6, the combined beam having aberrations according to the example of the present invention has two peaks at Z=0 mm and Z=15 mm. The peak at Z=0 mm is mainly formed by the laser beam of the wavelength of 400 nm and the peak at Z=15 mm is mainly formed by the laser beams of three wavelengths of 808 nm, 915 nm, and 980 nm. Using such a combined bean realizes, when cutting a plate of 15 to 20 mm thick, a sufficient peak intensity in the vicinity of the surface of the workpiece W and maintains the light intensity even in the vicinity of the bottom surface of the workpiece W, thereby preventing the generation of dross.

In FIGS. 5 and 6, it is assumed that each beam entirely reaches the optical axis Z. In practice, at a point of Z>0, part of a beam exceeding a kerf width of the cut workpiece W, i.e., a hem side of the beam is kicked by the surface of the workpiece W and only central part having a high peak intensity of the beam reaches the point of Z>0. The beam part rejected at the kerf increases temperatures at the periphery of the cut to expedite cutting.

A relationship between a laser beam wavelength and a reflectance will be explained. Many of metal materials tend to lower their reflectances (i.e., increase their absorptances) when the wavelength of a laser beam becomes shorter. For example, iron has a reflectance of about 60% at a room temperature with respect to a laser beam having a wavelength of about 1000 nm. If the wavelength is about 400 nm, the reflectance decreases to about 40%. Gold and copper, in particular, notably decrease their reflectances. For example, copper has a reflectance of about 90% at a room temperature with respect to a laser beam having a wavelength of about 1000 nm. When the wavelength is shortened to around 600 nm, the reflectance starts to suddenly decrease and becomes about 30% when the wavelength is shortened to about 400 nm.

Figure 7:
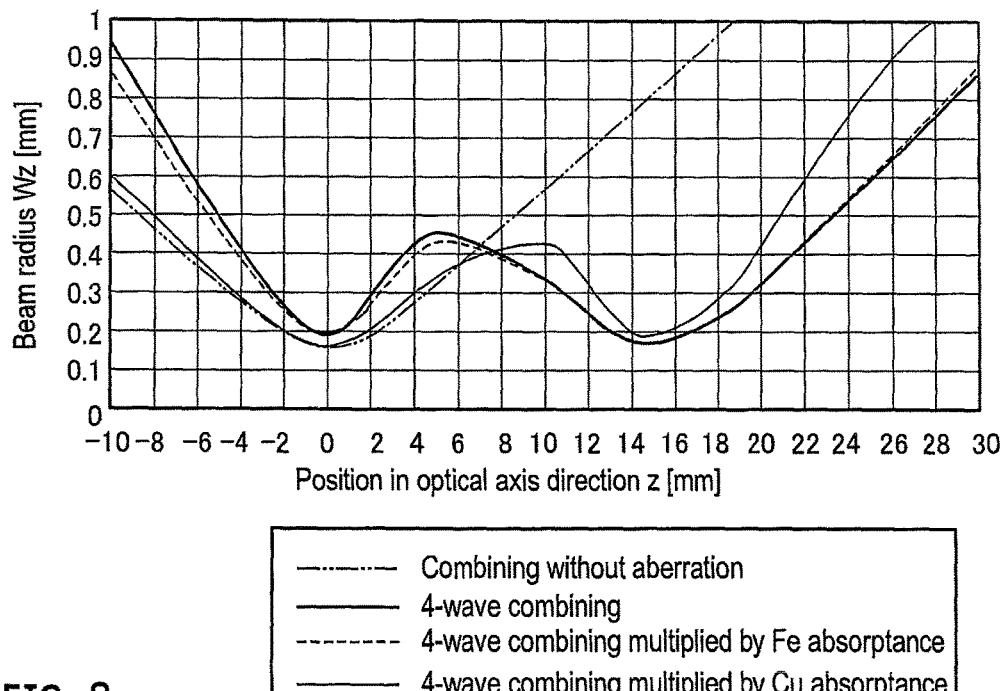
FIG. 7 is a graph illustrating radii of four-wavelength-combined beams multiplied by iron and copper absorptances.
Figure 8:
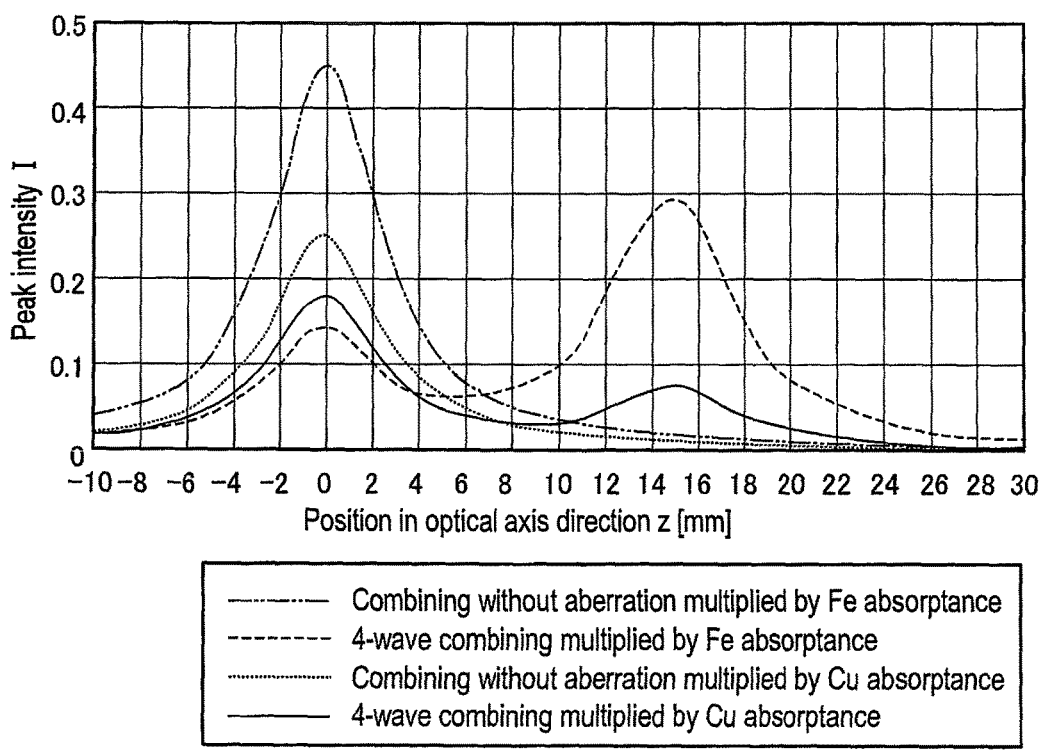
FIG. 8 is a graph illustrating peak intensities with respect to the optical axis multiplied by iron and copper absorptances.

FIGS. 7 and 8 illustrate values obtained by multiplying the values of FIGS. 5 and 6 by iron and copper absorptances (=100%−reflectance %). The Fe absorptance is 53% for 400 nm wavelength, 45% for 808 nm wavelength, 42.5% for 915 nm wavelength, and 40% for 980 nm wavelength. The Cu absorptance is 70% for 400 nm wavelength and 10% for 808 to 980 nm wavelength. In the case of copper, in particular, the absorptance for 400 nm wavelength is seven times larger than that for the other wavelengths. Accordingly, a peak on the surface side (at a level of Z=0 mm) of the workpiece is higher than that on the bottom surface side (Z=15 mm) of the workpiece, thereby providing a preferable light intensity distribution.

Controlling outputs of the laser beams of multiple wavelengths to form the combined beam illustrated in FIGS. 5 and 6 results in providing a light intensity distribution. appropriate for cutting a copper plate of about 15 mm to 20 mm thick serving as the workpiece W. If the workpiece W is iron, a peak on the surface side (Z=0 mm) of the workpiece W is lower than a peak on the bottom surface side (Z=15 mm). In this case, increasing an output of the laser beam on the shorter wavelength (400 nm) side relative to outputs of the laser beams on the longer wavelength (808 nm to 980 nm) side results in increasing the peak intensity on the surface side, i.e. shorter wavelength side, of the workpiece W higher than that on the bottom surface side, i.e. longer wavelength side.

In the above explanation, it is preferable that a distance from the top of a Rayleigh region of a laser beam whose focal length is on the shortest wavelength side among the laser beams of multiple wavelengths, i.e., a region within the range of upper and lower Rayleigh lengths around a beam waist of the laser beam in question to the bottom of a Rayleigh region of a laser beam whose focal length is on the longest wavelength side among the laser beams is substantially equal to the thickness of a workpiece.

As explained above, the embodiment of the present invention employs a multiple-wavelength laser beam to carry out processing. According to chromatic aberrations of the multiple-wavelength laser beam and the wavelength dependence of emissivity of a workpiece, the embodiment controls output of the multiple-wavelength laser beam so that a plurality of peaks appear in a thickness direction of the workpiece, thereby realizing a light intensity distribution appropriate for the workpiece W, in particular, appropriate for cutting a thick plate.

Also, the embodiment simultaneously drives a plurality of LDs 3 and jets a proper assist gas such as an oxygen gas or a nitrogen gas toward the vicinities of focusing positions, thereby realizing high-speed cutting.

Other Embodiments

Although the present invention has been explained on the basis of embodiment, it should not be understood that the explanation and drawings that form part of the disclosure limit the present invention. The disclosure may clarify, for persons skilled in the art, various substitutes, alternatives, and applications for the present invention.

Although the embodiment mainly explains the light intensity distribution having two peaks, the present invention is not limited to this. The number of peaks in a light intensity distribution may be 3 or more and may properly be determined according to the kind of a workpiece W, laser beam outputs, and the like.

Sheet metal processing to be carried out by the DDL processing apparatus according to the embodiment of the present invention includes not only cutting but also laser forming, annealing, abrading, and other kinds of sheet metal processing.

In this way, the present invention naturally covers various embodiments and the like that are not explained herein. Accordingly, technical scopes of the present invention are determined only by invention specific matters that are pertinent to the above-mentioned explanation and the claims.

According to the present invention, there are provided a direct diode laser processing apparatus and a sheet metal processing method for the apparatus that employ a multiple-wavelength laser beam for processing and realize a light intensity distribution in a workpiece thickness direction adequate for cutting a thick plate.

UNITED STATES DESIGNATION

In connection with United States designation, this international patent application claims the benefit of priority under 35 U.S.C. 119(a) to Japanese Patent Application No. 2014-209908 filed on Oct. 14, 2014 whose disclosed contents are incorporated herein by reference.

The invention claimed is:

1. A direct diode laser processing apparatus comprising:
a laser oscillator emitting a multiple-wavelength laser beam that has been spectral-beam-combined;
a transmission fiber transmitting the multiple-wavelength laser beam emitted from the laser oscillator; and
a laser processing machine condensing the multiple-wavelength laser beam transmitted through the transmission fiber and processing a workpiece, wherein
a light intensity distribution of the multiple-wavelength laser beam in a thickness direction of the workpiece is provided with a plurality of peaks due to chromatic aberrations of the multiple-wavelength laser beam and the wavelength dependence of emissivity of the workpiece.

2. The direct diode laser processing apparatus according to claim 1, wherein
there are two peaks within the range of a thickness of the workpiece.

3. The direct diode laser processing apparatus according to claim 1, wherein
a peak on the surface side of the workpiece is positioned in the vicinity of the surface of the workpiece and a peak on the bottom surface side of the workpiece is positioned in the vicinity of the bottom surface of the workpiece.

4. The direct diode laser processing apparatus according to claim 1, wherein
the peak on the surface side of the workpiece is greater than the peak on the bottom surface side of the workpiece.

5. The direct diode laser processing apparatus according to claim 1, wherein
the multiple-wavelength laser beam includes wavelengths in the range of 400 nm to 1000 nm.

6. The direct diode laser processing apparatus according to claim 1, wherein
the multiple-wavelength laser beam is formed by combining a laser beam having at least one wavelength in the range of 400 nm to 500 nm with a laser beam having at least one wavelength in the range of 800 nm to 1000 nm.

7. The direct diode laser processing apparatus according to claim 1, wherein
the workpiece has a plate thickness of 15 mm to 20 mm.

8. The direct diode laser processing apparatus according to claim 1, wherein
the laser oscillator controls output of the multiple-wavelength laser beam wavelength by wavelength, or wavelength band by wavelength band.

9. The direct diode laser processing apparatus according to claim 1, wherein
the higher the reflectance of the workpiece on the longer wavelength side compared to that on the shorter wavelength side, the higher the output of the multiple-wavelength laser beam is increased on the shorter wavelength side.

10. The direct diode laser processing apparatus according to claim 1, wherein
a distance from the top of a Rayleigh region at the focal length of a shortest wavelength of the multiple-wavelength laser beam to the bottom of a Rayleigh region at the focal length of a longest wavelength of the multiple-wavelength laser beam is substantially equal to the thickness of the workpiece.

11. A method of processing sheet metal of 15 mm to 20 mm thick with the use of the direct diode laser processing apparatus according claim 1, the method including:
simultaneously emitting a multiple-wavelength laser beam having different focusing positions in a thickness direction of the sheet metal toward a predetermined processing position of the sheet metal; and
blowing an assist gas toward the processing position.

12. A method of processing a workpiece with the use of a direct diode laser processing apparatus that includes a laser oscillator that emits a multiple-wavelength laser beam that has been spectral-beam-combined, a transmission fiber that transmits the multiple-wavelength laser beam emitted from the laser oscillator, and a laser processing machine that condenses the multiple-wavelength laser beam transmitted through the transmission fiber and processes the workpiece, the workpiece being sheet metal having a thickness of 15 mm or more, the method comprising:
to prevent dross production, concentrating a shorter-wavelength beam contained in the multiple-wavelength laser beam onto the surface of the sheet metal and a longer-wavelength beam contained in the multiple-wavelength laser beam onto the inside of the sheet metal.

13. The method of processing sheet metal according to claim 12, wherein
the longer-wavelength laser beam is concentrated onto the vicinity of the bottom surface of the sheet metal.

14. A method of processing sheet metal with the use of a direct diode laser processing apparatus that includes a laser oscillator that emits a multiple-wavelength laser beam which has been spectral-beam-combined, a transmission fiber that transmits the multiple-wavelength laser beam emitted from the laser oscillator, and a laser processing machine that condenses the multiple-wavelength laser beam transmitted through the transmission fiber and processes a workpiece, wherein:
controlling relative outputs of the multiple-wavelength laser beam so that a light intensity distribution of the multiple-wavelength laser beam in a thickness direction of the workpiece is provided with a plurality of peaks due to chromatic aberrations of the multiple-wavelength laser beam and the wavelength dependence of emissivity of the workpiece.

15. The method of processing sheet metal according to claim 12, wherein
the thickness of the sheet metal of the workpiece is less than 20 mm.

* * * * *